United States Patent [19]

Mori et al.

[11] Patent Number: 5,658,507
[45] Date of Patent: Aug. 19, 1997

[54] METHOD FOR THE PRE-ESTIMATION OF EXTRUDING PRESSURE AND EXTRUDING VELOCITY IN THE EXTRUSION MOLDING OF PARTICLE-REINFORCED COMPOSITES

[75] Inventors: Akiko Mori, Tosu; Akio Baba, Tsukuba, both of Japan

[73] Assignees: Japan as represented by Director General of Agency of Industrial Science and Technology; Japan as represented by Director General of Building Research Institute, both of Japan

[21] Appl. No.: 506,107

[22] Filed: Jul. 24, 1995

[30] Foreign Application Priority Data

Sep. 8, 1994 [JP] Japan ................................. 6-242086

[51] Int. Cl.[6] .......................................... B29C 47/92
[52] U.S. Cl. ............................ 264/40.1; 73/803; 73/841; 264/40.5; 425/135
[58] Field of Search ............................ 73/855, 856, 857, 73/858, 859, 860, 803, 841, 846, 845; 264/40.1, 236, 294, 349, 40.5; 425/135, 140

[56] References Cited

U.S. PATENT DOCUMENTS

| | | | |
|---|---|---|---|
| 2,231,769 | 2/1941 | Merrill | 264/236 |
| 2,549,144 | 4/1951 | Truscott | 264/294 |
| 3,235,640 | 2/1966 | Carton et al. | 264/102 |

FOREIGN PATENT DOCUMENTS

| | | | |
|---|---|---|---|
| 2723087 | 11/1978 | Germany | 73/841 |
| 287851 | 3/1991 | Germany | 73/841 |
| 61-100411 | 5/1986 | Japan | 264/40.1 |
| 61-102536 | 5/1986 | Japan | 73/841 |
| 1668908 | 8/1991 | U.S.S.R. | 73/841 |

*Primary Examiner*—Mathieu D. Vargot
*Attorney, Agent, or Firm*—Wenderoth, Lind & Ponack

[57] ABSTRACT

The extrusion moldability of particle-reinforced composites under fresh condition relative to the extruding pressure and extruding velocity can be pre-estimated from the cohesion and the coefficient of internal friction of the composite which can be calculated from the relationship of, when a frame divided into the upper and lower halves are filled with the composite and the upper and lower halves of the frame are displaced relative to each other in the horizontal direction under a pressure on the composite filling the frame, the shear stress of the composite against slip deformation.

2 Claims, 5 Drawing Sheets

METHOD FOR THE PRE-ESTIMATION OF EXTRUDING PRESSURE AND EXTRUDING VELOCITY IN THE EXTRUSION MOLDING OF PARTICLE-REINFORCED COMPOSITES

BACKGROUND OF THE INVENTION

The present invention relates to a method for the pre-estimation of the extruding pressure and extruding velocity in the preparation of an extrusion-molded article of particle-reinforced composites. More particularly, the invention relates to a method for the determination of the extrusion-moldability of particle-reinforced composites without actually undertaking the process of extrusion molding and to a method for the pre-estimation of the extruding pressure and extruding velocity prior to actually undertaking extrusion molding of particle-reinforced composites.

In the process of extrusion molding of particle-reinforced composites, in general, the material under extrusion is under an action that, while being compressed with a shearing force in the extrusion-molding machines, the particle-reinforced composites are squeezed out in a form by passing through the extrusion die mounted on the end of the extrusion-molding machines so that the materials for extrusion molding are required to have a special property as combinations of flowability and shape-retentivity. Accordingly, the property required for the composites to be extrusion-molded is within a limited range as compared with the particle-reinforced composites for the cast-molding methods with sheathing panels or wet-molding methods with screen-filters and the composites are imparted with practical extrusion moldability only when the composites are prepared within a limited range of formulation. Further, it is very important in the preparation of extrusion-molded products to pre-estimate the extruding pressure and extruding velocity without actually undertaking the process of extrusion molding by factory-size machines from the standpoint of accomplishing high productivity and good maintenance of the production plant. Nevertheless, no reliable method has been developed heretofore for the pre-estimation of the extruding pressure and the extruding velocity and no definite guidelines are available therefor. The only way to determine the extrusion moldability of particle-reinforced composites is to repeat the actual process of extrusion molding in a trial-and-error basis to seek the optimum formulation of the component materials to comply with the extruding pressure and extruding velocity required in the running conditions of the extrusion-molding machines such as revolution of the screws therein.

In this way, the extruding pressure and extruding velocity in the conventional process in preparing of extrusion-molded articles of particle-reinforced composites heretofore undertaken cannot be predicted. Namely, test extrusion molding is repeatedly undertaken with the composites to find out a guideline for the modification or optimization of the formulation of the respective component materials to comply with the desired extruding pressure and extruding velocity finally arriving at optimum extruding conditions. Such a trial-and-error procedure naturally takes a great deal of man power and time.

SUMMARY OF THE INVENTION

The present invention accordingly has an object, in view of the above mentioned problems in the conventional process for the preparation of an extrusion-molded article of particle-reinforced composites, to provide a means for the pre-estimation of the extruding pressure and extruding velocity to find out the extrusion-moldability of a composition of the composites without actually undertaking the process of extrusion molding.

Thus, the method of the present invention for the pre-estimation of the extruding pressure and extruding velocity of a composition of the composites in a process for the preparation of a molded article by extrusion molding comprises filling a frame divided into the upper half and the lower half with the composition, which is under pressure as an axial load by mounting a weight thereon, displacing the upper and lower halves of the frame filled with the composition relative to each other in the horizontal direction to determine the shear stress of the composition against slip deformation to calculate the cohesion and coefficient of internal friction of the composition from the displacement and the shear stress against slip deformation.

Further, the invention provides a method for the pre-estimation of the extruding velocity in a process for the preparation of an extrusion-molded article of particle-reinforced composites which comprises making a pre-estimation of the extruding pressure from the relationship between the cohesion and coefficient of internal friction of the composition under pressure as mentioned above, determining the volume of material conveyance per revolution of the screw and multiplying the volume of material conveyance per revolution of the screw by the velocity of screw revolution and then dividing the same by the aperture area of the extrusion die.

DETAILED DESCRIPTION OF THE PREFERRED EMBODIMENTS

Figure 1:
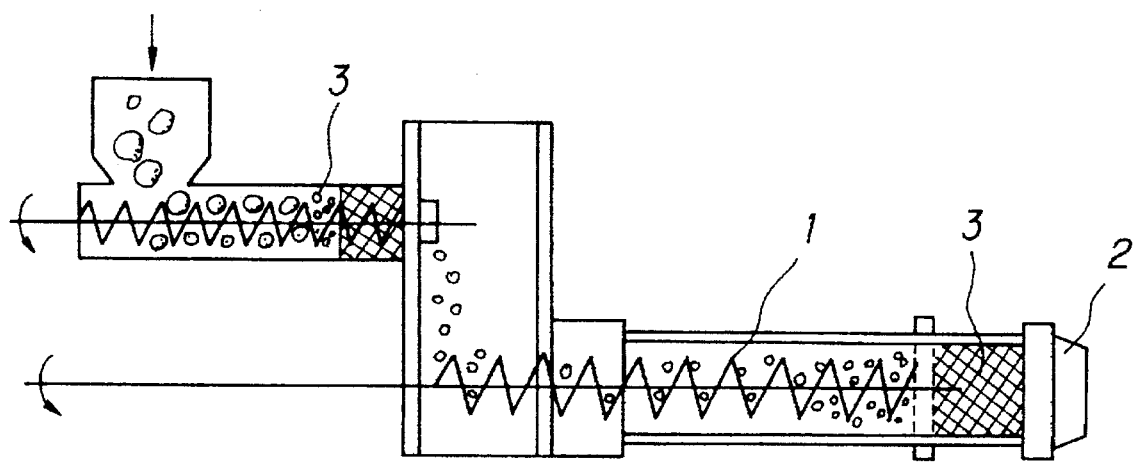
FIG. 1 is a schematic cross sectional view of an extrusion molding machine in practicing the method of the present invention.

In a process of extrusion molding of particle-reinforced composites, the composition is extrusion-molded into a shaped body by being released under atmospheric pressure out of the extrusion die while receiving a shearing action in the extruder machine. Namely, the particle-reinforced composite is plastically deformed along with shear fracture under shearing force by the extruding pressure and it is sometimes the case that the shear stress of the composition is increased by the pressure so as to cause a difficulty in the extrusion molding. Accordingly, it is important to definitely know the relationship between the extruding pressure and the shear strength of the composition beforehand.

The basic principle of the inventive method is derived from an idea that, when a frame divided into the upper half and the lower half is filled with the composition and the upper and lower halves of the frame are displaced relative to each other in the horizontal direction to determine the slip deformation and the shear stress of the composite against displacement under pressure, the extruding pressure is pre-estimated from the relationship between the pressure on the composition and the shear stress of the composition. The volume of material conveyance per revolution of the screw is obtained from the pre-estimated extruding pressure, the volume of material processing per unit time is calculated by multiplying the volume of material conveyance per screw revolution by the velocity of screw revolution and the extruding velocity is pre-estimated by dividing the volume of material processing per unit time by the aperture area of the extrusion die.

Thus, the method of the present invention for the pre-estimation of the extruding pressure and the extruding velocity in a process for the preparation of an extrusion-molded article of particle-reinforced composites basically comprises pre-estimating the extruding pressure from the shear stress of the composite taking the shear stress of the composition against slip deformation as a measure, pre-estimating the volume of material conveyance per revolution of the screw from the extruding pressure, pre-estimating the volume of material processing per unit time from the volume of material conveyance per revolution of the screw and pre-estimating the extruding velocity from the volume of material processing per unit time.

According to the method of the present invention, it is possible to pre-estimate the extruding pressure and the extruding velocity without actually undertaking the process of extrusion molding with the composition of particle-reinforced composites when the relationship between the shear strength of the composition and the pressure thereon and the relationship between the extruding pressure and the volume of material conveyance per revolution of the screw are obtained beforehand. Accordingly, the present invention provides a means to optimize the formulation of the composition to comply with the targeted extruding pressure and extruding velocity. Thus, the present invention provides a means to determine the operating pressure and operating velocity of the process of extrusion molding in compliance with the formulation and usability of the respective component materials without consumption of a great deal of man power and time.

In the following, the method of the present invention is described in more details by way of examples with reference to the accompanying drawing.

Figure 2:
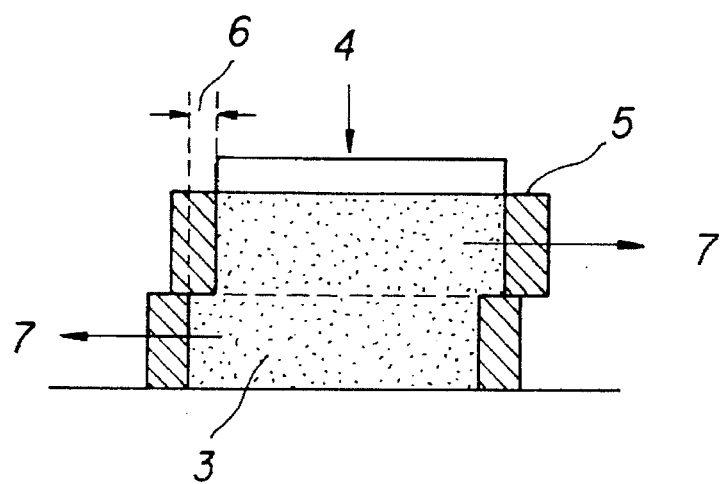
FIG. 2 is a vertical cross sectional view of the test frame divided into the upper and lower halves to be displaced in the horizontal direction and filled with a particle-reinforced composite under axial load.

FIG. 1 is a schematic cross sectional view of an extrusion molding machine suitable for practicing the method of the invention. FIG. 2 is a schematic vertical cross sectional view of an assembly for the measurement of the cohesion and coefficient of internal friction of the composition in practicing the method of the present invention. The reference numerals 1 to 7 in FIGS. 1 and 2 indicate (1) a screw of the extruder machine, (2) extrusion die, (3) particle-reinforced composite, (4) pressure weight to give an axial load on the material to be extruded, (5) frame divided into the upper and lower halves, (6) slip deformation of the composite in the horizontal direction and (7) shear load against slip deformation, respectively.

Figure 3A:
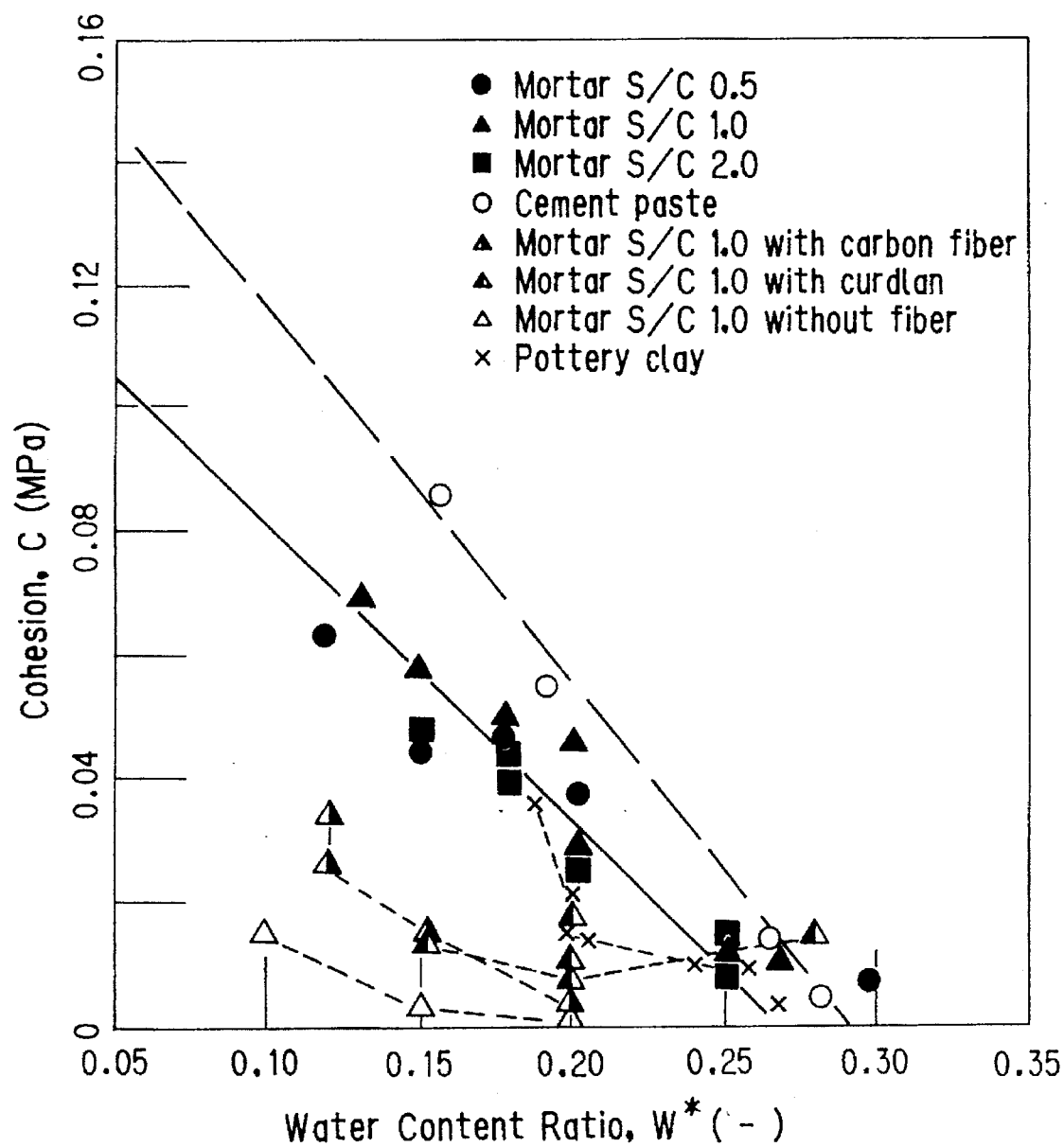
FIG. 3a is a graph showing the cohesion of a particle-reinforced composite as a function of the water content ratio.
Figure 3B:
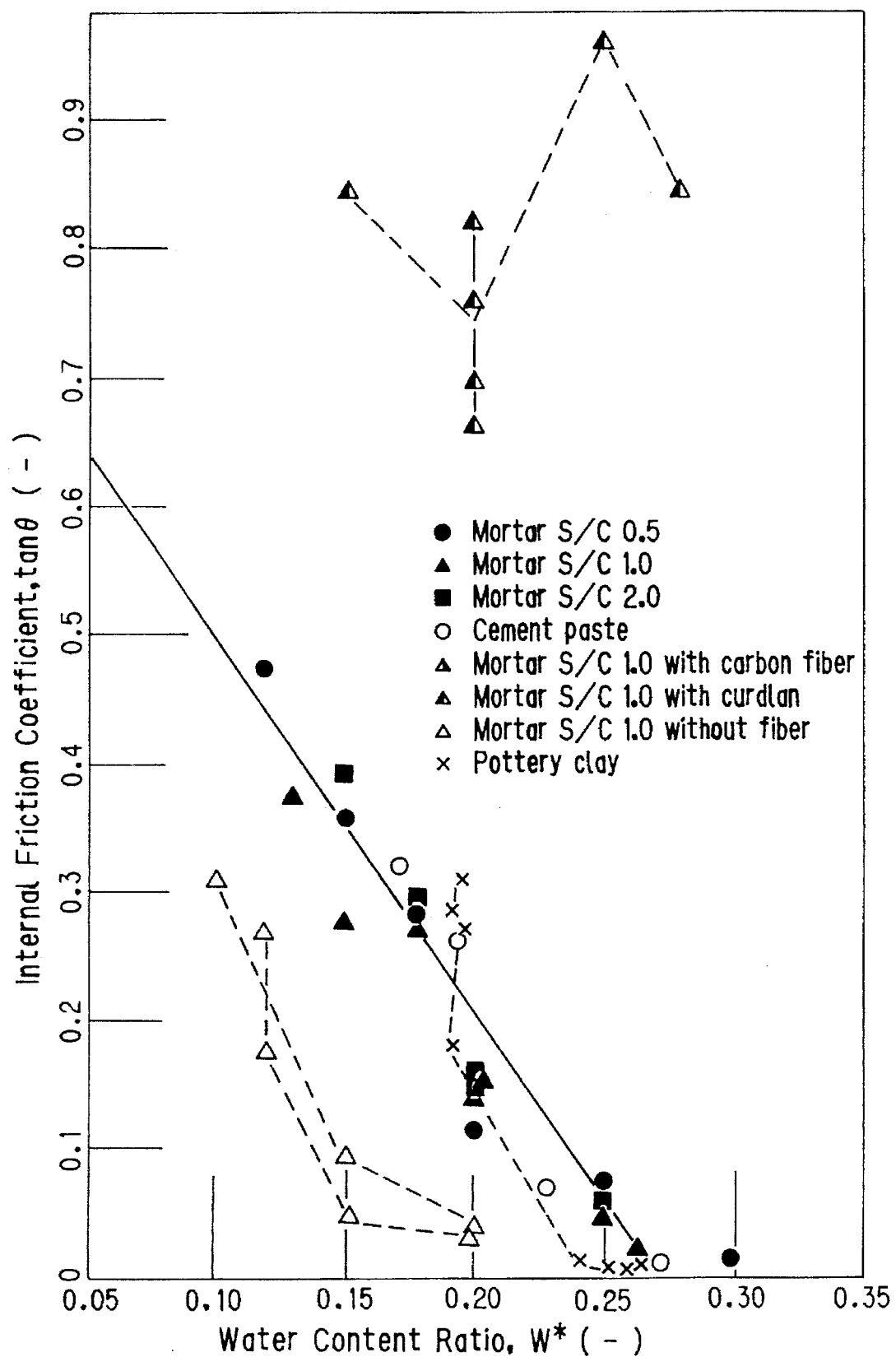
FIG. 3b is a graph showing the coefficient of internal friction of a particle-reinforced composite as a function of the water content ratio.

FIGS. 3a and 3b are each a graph showing the relationship between the water content ratio and the cohesion or the coefficient of internal friction, respectively, of the composition as a measure of the shear stress of the composite against slip deformation, which are obtained when the composition is subjected to shear fracture in a frame divided into the upper half and the lower half and filled with the composition of which the upper and lower halves are displaced relative to each other in the horizontal direction. The cohesion and the coefficient of internal friction of a particle-reinforced composition are each a parameter inherent in the composition or the respective formulation thereof.

Figure 4:
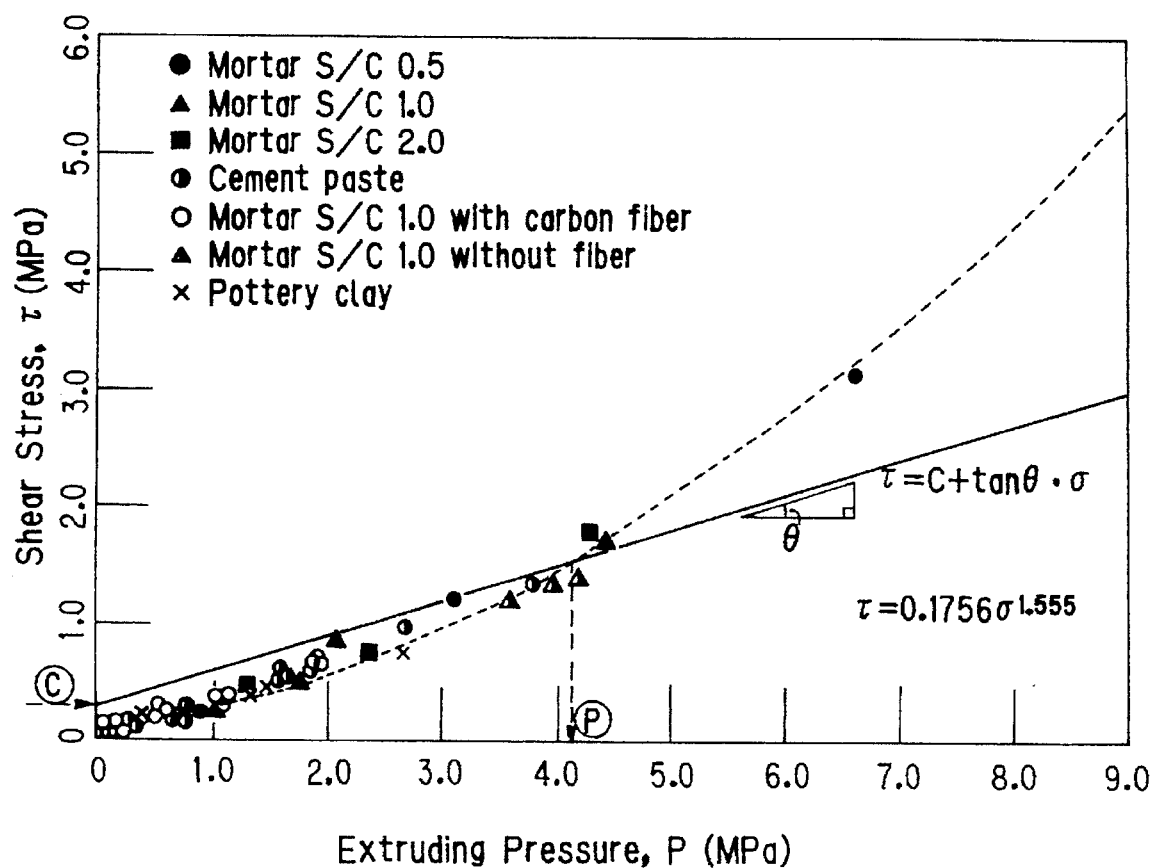
FIG. 4 is a graph showing the shear stress in the composition as a function of the extruding pressure.
Figure 5:
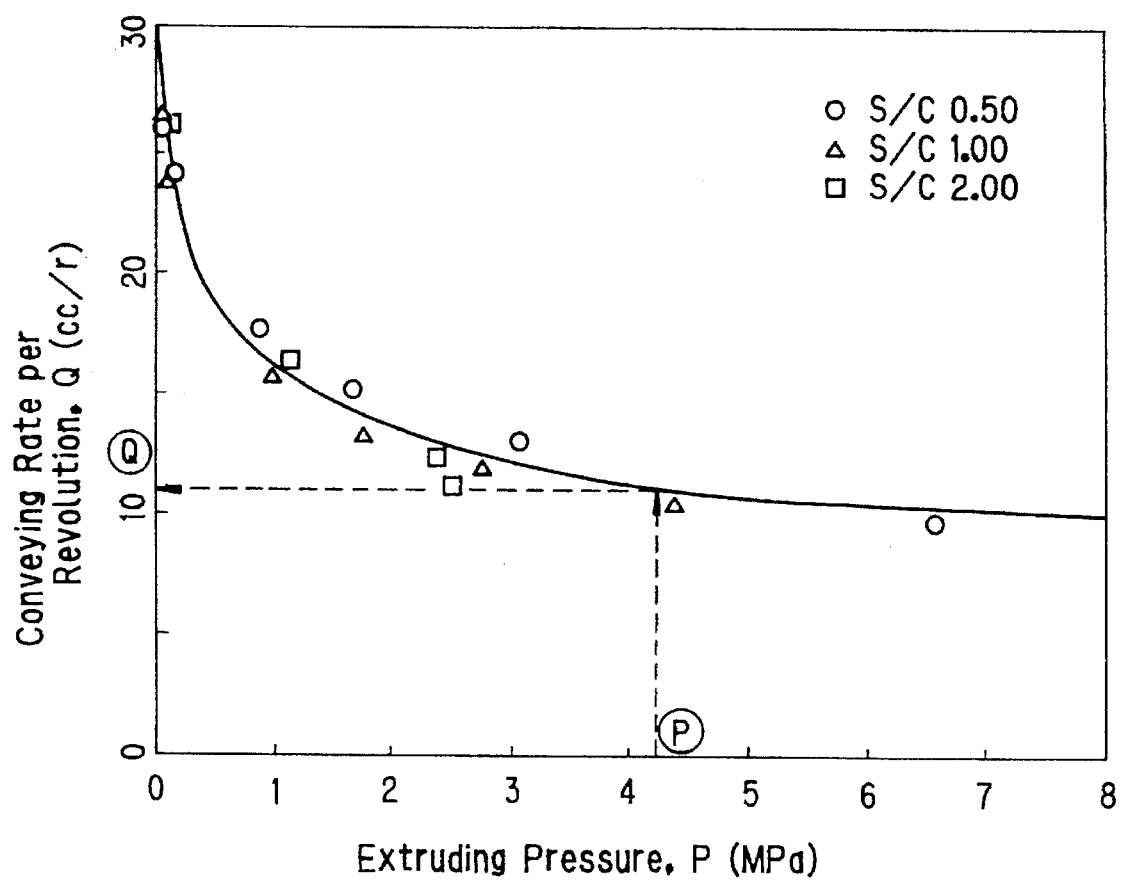
FIG. 5 is a graph showing the conveyance rate of the composition per revolution of the screw as a function of the extruding pressure.

FIG. 4 is a graph showing the relationship between the pressure and the shear stress of the composition, which is obtained from the cohesion and coefficient of internal friction as well as the extruding pressure. The downwardly convex curve of the figure indicates the relationship between the shear stress and the extruding pressure. FIG. 5 is a graph showing the relationship between the extruding pressure and the volume of material conveyance per revolution of the screw obtained by first multiplying the extruding velocity by the aperture area of the extrusion die to give the volume of material processing per unit time and then dividing the value by the velocity of the screw revolution.

The component materials and the compounding proportions thereof in the following experiments were as follows: sand:binder ratio=0.5 to 2.0; water content ratio=0.120 to 0.300; water:binder ratio=0.205 to 1.000; visco additive (methyl cellulose)=0.01; and fibrous additive (chrysotile)= 0.05. The velocity of screw revolution was 11.0 to 26.5 rpm.

A composite material 3 prepared by mixing the respective component materials according to a different formulation was extruded out of an extrusion die 2 having a 12.0 mm by 60.0 mm aperture mounted on an extrusion molding machine having a screw 1 of 50 mm diameter and the extruding pressure and the extruding velocity were determined. Separately, a frame 5 divided into the upper half and the lower half was filled with the composition as prepared and the upper and lower halves of the frame were displaced relative to each other in the horizontal direction under a varied vertically applied axial load 4 on the composite filling the frame 5 to determine the shear load 7 against slip deformation 6. The thus obtained results were used for the calculation of the cohesion and the coefficient of internal friction of the composite as a measure of the shear stress against slip deformation. The cohesion and the coefficient of internal friction of the composite are shown in FIGS. 3a and 3b, respectively, as a function of the water content ratio in the formulation of the composition. FIG. 4 of the accompanying drawing shows the shear stress of the composite, which was obtained from the experimentally obtained cohesion and coefficient of internal friction of the composite as well as the extruding pressure, as a function of the extruding pressure. On the other hand, the volume of material processing per unit time was obtained by multiplying the extruding velocity by the aperture area of the extrusion die and the volume of material conveyance per revolution of the screw was obtained by dividing the above obtained value by the velocity of screw revolution. FIG. 5 shows the thus obtained volume of material conveyance per revolution of the screw as a function of the extruding pressure.

According to the results of the experiments undertaken by using composites of different formulations, the relationships illustrated in FIGS. 3a, 3b, 4 and 5 were held irrespective of the formulation relative to the proportions of the respective component materials.

In the above described experiments, measurements were made for the composite as prepared by mixing, with which a frame divided into the upper and lower halves was filled, to determine the relative slip deformation of the composite in the upper and lower halves of the frame displaced in the horizontal direction under a varied pressure on the composite and the shear stress and the cohesion and coefficient of internal friction of the composite were obtained as a measure of the shear stress. When a straight line is drawn in FIG. 4 with the cohesion as the intercept on the y-axis and the coefficient of internal friction as the gradient, the point of intersection thereof with the curve gives the pre-estimated extruding pressure on the x-axis.

EXAMPLE 1

A test frame divided into the upper and lower halves was filled with a fresh composition of particle-reinforced composites prepared according to the formulation with a sand:binder ratio of 0.50; water content ratio of 0.150; water:binder ratio of 0.264; visco additive (methyl cellulose) of 0.01; and fibrous additive (chrysotile) of 0.05 and the upper and lower halves of the frame were displaced relative to each other in the horizontal direction under a varied vertical load on the composite filling the frame to determine the shear stress against slip deformation. The thus obtained results were used for the calculation of the cohesion and the coefficient of internal friction of the composite. When a straight line was drawn in FIG. 4 with the cohesion as the intercept on the y-axis and the coefficient of internal friction as the gradient, the straight line intersected the curve to give a point of intersection corresponding to the pre-estimated extruding pressure of 3.0 MPa on the x-axis. The volume of material conveyance could be estimated to be 13.6 ml per revolution of the screw from the graph of FIG. 5 for the above obtained pre-estimated extruding pressure of 3.0 MPa. The value of 13.6 ml per revolution of the screw was multiplied by the velocity of screw revolution and then divided by the aperture area of the extrusion die to give a extruding velocity of 20.8 cm/minute assuming a screw revolution of 11.0 rpm.

On the other hand, an actual extrusion test of the same composite gave an extruding velocity of 20.0 cm/minute at an extruding pressure of 3.1 MPa to be in quite good coincidence with the pre-estimated values for the extruding pressure and extruding velocity.

EXAMPLE 2

A test frame divided into the upper and lower halves was filled with a fresh composite without any sand prepared according to the formulation with a sand:binder ratio of 0; water content ratio of 0.223; water:binder ratio of 0.288; visco additive (methyl cellulose) of 0.01; and fibrous additive (chrysotile) of 0.05 and the upper and lower halves of the frame were displaced relative to each other in the horizontal direction under a varied vertical load on the composite filling the frame to determine the shear stress against slip deformation. The thus obtained results were used for the calculation of the cohesion and the coefficient of internal friction of the composite. When a straight line was drawn in FIG. 4 with the cohesion as the intercept on the y-axis and the coefficient of internal friction as the gradient, the straight line intersected the curve to give a point of intersection corresponding to the pre-estimated extruding pressure of 0.074 MPa on the x-axis. The volume of material conveyance could be estimated to be 25.7 ml per revolution of the screw from the graph of FIG. 5 for the above obtained pre-estimated extruding pressure of 0.074 MPa. The value of 25.7 ml per revolution of the screw was multiplied by the velocity of screw revolution and then divided by the aperture area of the extrusion die to give an extruding velocity of 39.4 cm/minute assuming a screw revolution of 26.5 rpm.

On the other hand, an actual extrusion test of this extruding composite gave an extruding velocity of 41.1 cm/minute at an extruding pressure of 0.079 MPa to be in quite good coincidence with the pre-estimated values for the extruding pressure and extruding velocity.

EXAMPLE 3

A test frame divided into the upper and lower halves was filled with a fresh composition of particle-reinforced composites with carbon fiber prepared according to the formulation with a sand:binder ratio of 1.00; water content ratio of 0.120; water:binder ratio of 0.273; visco additive (methyl cellulose) of 0.01; and fibrous additive (carbon fiber) of 0.05 and the upper and lower halves of the frame were displaced relative to each other in the horizontal direction under a varied vertical load on the composite filling the frame to determine the shear stress against slip deformation. The thus obtained results were used for the calculation of the cohesion and the coefficient of internal friction of the composite. When a straight line was drawn in FIG. 4 with the cohesion as the intercept on the y-axis and the coefficient of internal friction as the gradient, the straight line intersected the curve to give a point of intersection corresponding to the pre-estimated extruding pressure of 1.5 MPa on the x-axis. The volume of material conveyance could be estimated to be 13.0 ml per revolution of the screw from the graph of FIG. 5 for the above obtained pre-estimated extruding pressure of 1.5 MPa. The value of 13.0 ml per revolution of the screw was multiplied by the velocity of screw revolution and then divided by the aperture area of the extrusion die to give extruding velocities of 19.8, 28.8 and 47.8 cm/minute assuming screw revolutions of 11.0 rpm, 16.0 rpm and 26.5 rpm, respectively.

On the other hand, actual extrusion tests of the same composite gave extruding velocities of 17.0, 26.5 and 43.0 cm/minute at an extruding pressure of 1.38 MPa to be in quite good coincidence with the pre-estimated values for the extruding pressure and extruding velocity.

EXAMPLE 4

A test frame divided into the upper and lower halves was filled with a fresh composition of particle-reinforced composites prepared according to the formulation with a sand:binder ratio of 1.00; water content ratio of 0.100; water:binder ratio of 0.222; and visco additive (methyl cellulose) of 0.01 with omission of the fibrous additive and the upper and lower halves of the frame were displaced relative to each other in the horizontal direction under a varied vertical load on the composite filling the frame to determine the shear stress against slip deformation. The thus obtained results were used for the calculation of the cohesion and the coefficient of internal friction of the composite. When a straight line was drawn in FIG. 4 with the cohesion as the intercept on the y-axis and the coefficient of internal friction as the gradient, the straight line intersected the curve to give a point of intersection corresponding to the pre-estimated extruding pressure of 3.2 MPa on the x-axis. The volume of material conveyance could be estimated to be 12.6 ml per revolution of the screw from the graph of FIG. 5 for the above obtained pre-estimated extruding pressure of 3.2 MPa. The value of 12.6 ml per revolution of the screw was multiplied by the velocity of screw revolution and then divided by the aperture area of the extrusion die to give an extruding velocity of 28.0 cm/minute assuming a screw revolution of 16.0 rpm.

On the other hand, an actual extrusion test of the same composite gave an extruding velocity of 31.0 cm/minute at an extruding pressure of 3.0 MPa to be in quite good coincidence with the pre-estimated values for the extruding pressure and extruding velocity.

EXAMPLE 5

A test frame divided into the upper and lower halves was filled with a fresh composition of particle-reinforced composites with super plasticizer prepared according to the formulation with a sand:binder ratio of 1.00; water content ratio of 0.20; water:binder ratio of 0.50; visco additive (curdlan) of 0.01; and fibrous additive (chrysotile) of 0.05 and the upper and lower halves of the frame were displaced relative to each other in the horizontal direction under a varied vertical load on the composite filling the frame to determine the shear stress against slip deformation. The thus obtained results were used for the calculation of the cohesion and the coefficient of internal friction of the composite. When a straight line was drawn in FIG. 4 with the cohesion as the intercept on the y-axis and the coefficient of internal friction as the gradient, the straight line intersected the curve to give a point of intersection corresponding to the pre-estimated extruding pressure of 12.8 MPa on the x-axis. The volume of material conveyance could be estimated to be 8.3 ml per revolution of the screw from the graph of FIG. 5 for the above obtained pre-estimated extruding pressure of 12.8 MPa. The value of 8.3 ml per revolution of the screw was multiplied by the velocity of screw revolution and then divided by the aperture area of the extrusion die to give an extruding velocity of 17.4 cm/minute assuming a screw revolution of 16.0 rpm.

On the other hand, actual extrusion test of this composite was attempted to find that extrusion molding could not be performed because the extruding pressure exceeded 6.0 MPa as the upper limit of the extruding pressure possible in the extrusion molding machine used in the test to be in compliance with the result of the pre-estimation.

What is claimed is:

1. A method for pre-estimation of the extruding pressure (P) of a fresh mixture of particle-reinforced composites and a process for the preparation of a molded article by extrusion molding using an extrusion molding machine, which comprises the steps of:
    (a) filling a frame divided into the upper half and the lower half with the mixture, which is under pressure by applying an axial load thereon; and
    (b) displacing the upper and lower halves of the frame filled with the fresh mixture relative to each other in the horizontal direction to determine the cohesion (C) and coefficient of internal friction (tan θ) of the mixture as a function of the shear stress (τ) of the mixture against slip deformation, wherein $\tau = C + \tan\theta \cdot \sigma$, and wherein the extruding pressure (P) is pre-estimated from the relationship between the cohesion (C) and coefficient of internal friction (tan θ) of the mixture under pressure as follows:
    (i) plot extruding pressure (P) as the x-axis versus shear stress (τ) as the y-axis for a given extrusion machine using a mixture of given materials and a given formulation;
    (ii) superimposing on the above plot of (i), a straight line derived by connecting cohesion (C) of said mixture as the intercept on the y-axis and the coefficient of internal friction (tan θ) of said mixture as the gradient of said line, so that said line intercepts the plot of (a); and
    (iii) employing the location of said intercept on the x-axis as said pre-estimated extruding pressure.

2. A method for the pre-estimation of the extruding velocity (V) of a fresh mixture of particle-reinforced composites in a process for the preparation of a molded article by extrusion molding through an extrusion die of an extrusion molding machine employing a screw to force said mixture into said die under an extruding pressure which comprises the steps of:
    (I) pre-estimating the extruding pressure by steps comprising:
        (a) filling a frame divided into the upper half and the lower half with the mixture, which is under pressure by applying an axial load thereon; and
        (b) displacing the upper and lower halves of the frame filled with the fresh mixture relative to each other in the horizontal direction to determine the cohesion (C) and coefficient of internal friction (tan θ) of the mixture as a function of the shear stress (τ) of the mixture against slip deformation, wherein $\tau = C + \tan\theta \cdot \sigma$, and wherein the extruding pressure (P) is pre-estimated from the relationship between the cohesion (C) and coefficient of internal friction (tan θ) of the mixture under pressure as follows:
        (i) plot extruding pressure (P) as the x-axis versus shear stress (τ) as the y-axis for a given extrusion machine using a mixture of given materials and a given formulation;
        (ii) superimposing on the above plot of (i), a straight line derived by connecting cohesion (C) of said mixture as the intercept on the y-axis and the coefficient of internal friction (tan θ) of said mixture as the gradient of said line, so that said line intercepts the plot of (a); and
        (iii) employing the location of said intercept on the x-axis as said pre-estimated extruding pressure;
    (II) determining the volume of material conveyance per revolution of the screw of the extrusion molding machine (Q); and
    (III) multiplying Q by the velocity of screw revolution n, and then dividing Q·n by the aperture area A of the extrusion die according to the formula $$V = \frac{Q \cdot n}{A}$$

to thereby obtain said extruding velocity (V).

* * * * *